United States Patent
Kurita et al.

[11] Patent Number: 6,131,827
[45] Date of Patent: Oct. 17, 2000

[54] NOZZLE HOLE PLATE AND ITS MANUFACTURING METHOD

[75] Inventors: Mikiya Kurita, Toyoake; Shoichi Takenouchi, Toyota, both of Japan

[73] Assignee: Denso Corporation, Japan

[21] Appl. No.: 09/274,995

[22] Filed: Mar. 24, 1999

[30] Foreign Application Priority Data

Mar. 25, 1998 [JP] Japan .................................. 10-077099

[51] Int. Cl.[7] .......................... F02M 59/00; A62C 31/02; B05B 1/00; F23D 11/38
[52] U.S. Cl. ........................ 239/533.2; 239/589; 239/596
[58] Field of Search ............................... 239/533.2, 589, 239/596; 29/890.142, 890.132, 890.12, 557

[56] References Cited

U.S. PATENT DOCUMENTS

| | | | |
|---|---|---|---|
| 4,828,184 | 5/1989 | Gardner et al. | 29/890.142 |
| 5,109,823 | 5/1992 | Yokoyama et al. | 29/890.142 |
| 5,857,628 | 1/1999 | Kubach | 239/596 |
| 5,899,390 | 5/1999 | Arndt et al. | 239/596 |

Primary Examiner—Andres Kashnikow
Assistant Examiner—Davis Hwu
Attorney, Agent, or Firm—Nixon & Vanderhye PC

[57] ABSTRACT

In a method for manufacturing a nozzle hole plate suitable for use in a fuel injection valve, a nozzle hole is formed at a predetermined angle of inclination by press-working with a punch in a thin-plate base material of a nozzle hole plate. When the nozzle hole is formed by press-working, a bluntness (shear drop) and a break face are formed at the corners of the base material at the fluid entrance and the fluid exit of the nozzle hole respectively, and as a result of the formation of this shear drop and break face the flow changes and the injection quantity increases. The injection quantity of the nozzle hole is measured for each nozzle hole plate, and its deviation from a target value is detected. Then, on the basis of the measured injection quantity value, the base material around the fluid entrance of the nozzle hole is notched by press-working using a punch. The material of the base material dimpled by the notching is pushed toward the fluid entrance of the nozzle hole and the shear drop diminishes. Consequently, the quantity of fuel injected through the nozzle hole plate decreases. Thus it is possible to provide a nozzle hole plate and a manufacturing method thereof with which a required injection quantity can be obtained in a short working time.

24 Claims, 8 Drawing Sheets

FIG. 13
FIG. 14
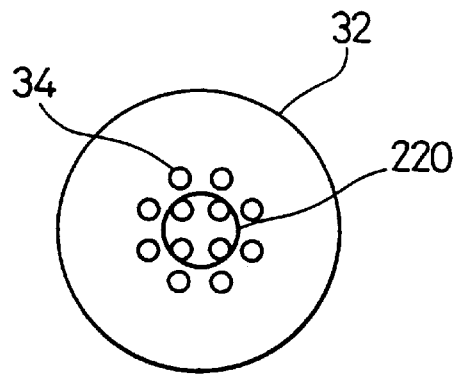
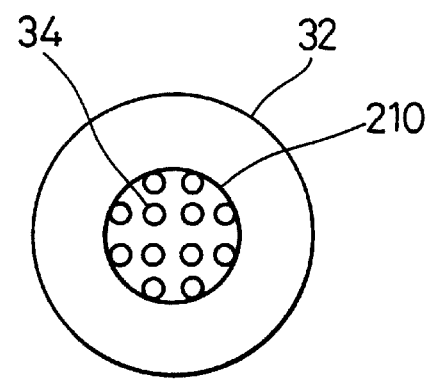
FIG. 15
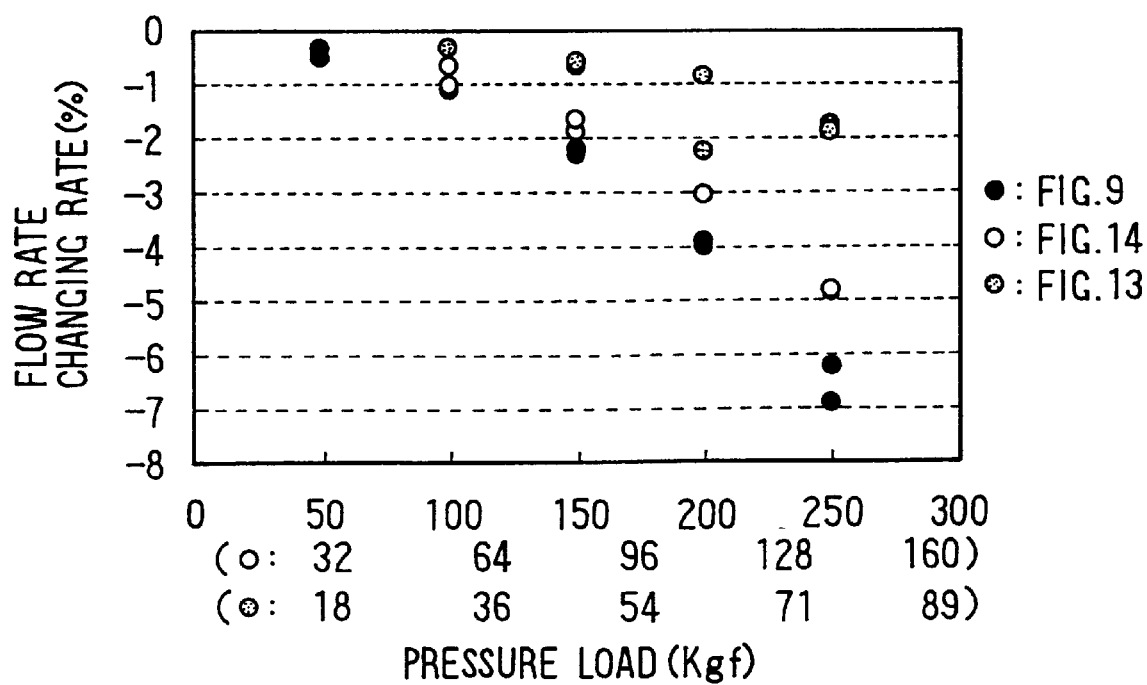

NOZZLE HOLE PLATE AND ITS MANUFACTURING METHOD

CROSS REFERENCE TO RELATED APPLICATION

This application is based upon and claims priority from Japanese Patent Application No. H. 10-77099 filed Mar. 25, 1998, the contents of which are incorporated herein by reference.

BACKGROUND OF THE INVENTION

1. Field of the Invention

The present invention relates to a nozzle hole plate having a nozzle hole for a fluid to be injected through, and to a method for manufacturing the nozzle hole plate.

2. Description of Related Art

When a nozzle hole plate is manufactured by forming a nozzle hole, through which a fluid is injected, on a base material, it is usual for the nozzle hole to be formed by electric discharge machining or press-working. The injection quantity varies with the hole diameter of the nozzle hole, the inner circumferential surface forming the nozzle hole, and the machined state of the fluid entrance corner and the fluid exit corner of the nozzle hole.

In this specification, the "hole diameter" means a fluid path diameter of the nozzle hole excluding the fluid entrance and the fluid exit. In particular, the injection quantity varies greatly with the hole diameter and the machined state of the fluid entrance corner of the nozzle hole. For example when shear drop (also referred to in this application as 'bluntness') arises at the fluid entrance corner, the injection quantity increases.

When nozzle holes are formed by electric discharge machining, the nozzle holes are formed without the fluid entrance corner becoming blunt (that is, the nozzle holes are formed without shear drop). However, the electric discharge machining has a shortcoming that because variation in hole diameter is large, the injection quantity varies among nozzle hole plates.

When nozzle holes are formed by press-working, if the nozzle holes are punched by press-working using the same diameter of punch, there is very little dispersion in hole diameter. However, because formation of nozzle holes by press-working is a process of punching part of a thin-plate base material mechanically, a bluntness (shear drop) is generated at the fluid entrance corners and the fluid exit corners of the nozzle holes. The amount of bluntness varies with factors such as wear with age of the punch and the mechanical characteristics of the base material. Because the amount of bluntness of the fluid entrance corner is a factor which greatly influences the injection quantity, when this amount of bluntness varies then the injection quantity varies greatly among nozzle hole plates. Variation in the injection quantity increases in proportion to the number of nozzle holes formed in each nozzle hole plate.

In this connection, it may be conceivable to measure the injection quantity of each nozzle hole plate in which nozzle holes are formed and reduce dispersion in the injection quantity by carrying out hole diameter adjustment or shear drop elimination of the fluid entrance corners in correspondence with the measurement results.

The shear drop elimination can be carried out by conventional fluid polishing or grinding using a grindstone. However, because polishing and grinding take a long time, a great deal of processing time is required to carry out the shear drop elimination of individual nozzle hole plates by polishing or grinding in correspondence with measurement results. Furthermore, because the manufacture of nozzle hole plates normally involves the continuous processing of a hoop material or setting and punching of a large number of thin-plate base materials, it is difficult to carry out polishing or grinding of individual, small nozzle hole plates.

Also, to finely adjust the injection quantity of a nozzle hole plate or to avoid impeding the fluid flow entering nozzle holes, it may be desirable to process only some of a number of nozzle holes formed in the nozzle hole plate or process only a part of the area around the fluid entrance of each nozzle hole. However, because it is impossible to reduce the size of a fluid polishing brush or a grindstone beyond a certain limit, it is difficult to process such minute areas. Furthermore, although processing by polishing and grinding can remove the shear drop (bluntness), it cannot correct variations in hole diameter.

SUMMARY OF THE INVENTION

The present invention is made in light of the foregoing problem, and it is an object of the present invention to provide a nozzle hole plate and a nozzle hole plate manufacturing method with which it is possible to obtain a required injection quantity in a short processing time.

It is another object of the present invention to provide a nozzle hole plate and a nozzle hole plate manufacturing method which make possible fine adjustment of the injection quantity.

It is a further object of the present invention to provide a nozzle hole plate and a nozzle hole plate manufacturing method with which fluid flow entering the nozzle holes is not impeded.

According to a nozzle hole plate manufacturing method of the present invention, a nozzle hole is formed in a thin-plate base material, and the base material around an opening of the nozzle hole is notched on the basis of the injection quantity of the nozzle hole plate injected through the nozzle hole, whereby material of the base material is pushed toward the nozzle hole. Accordingly, it is possible to adjust the amount of bluntness formed at the corner of the opening and the hole diameter of the nozzle hole. The base material around the opening can be notched easily by for example coining using a punch or notching. Because by press-working using a punch a base material can be easily processed in a short time, the injection quantity of an individual nozzle hole plate can be adjusted in a short time. Thus it is possible to easily reduce dispersion of injection quantity among nozzle hole plates and easily adjust the injection quantity of each nozzle hole plate to a required value.

Further, with the shape of a tool used for notching the base material around the opening of a nozzle hole, and the working position and the working load and so on as parameters, by ascertaining the relationships between these parameters and the injection quantity in advance, it is possible to adjust the hole diameter and the amount of bluntness of the nozzle hole with high precision and thereby to adjust the injection quantity accurately.

Of the two openings of a nozzle hole, the fluid entrance and the fluid exit, the injection quantity varies particularly greatly with the shape of the fluid entrance. According to another aspect of the present invention, the base material around the fluid entrance of the nozzle hole is notched, whereby it is possible to adjust the injection quantity with a small notch. Thus it is possible to minimize deformation of the fluid path shape of the nozzle hole caused by the notching process.

According to another aspect of the present invention, a plurality of nozzle holes are formed and the base material around the openings of some of the nozzle holes is notched. In this case, compared to when the base material around the openings of every one of the nozzle holes is notched, if the notches are the same, the change in the injection quantity is smaller. Therefore, fine adjustment of the injection quantity is realized.

According to another aspect of the present invention, a portion of the base material around the opening of a nozzle hole is notched. In this case, compared to when the base material around the full circumference of the opening is notched, if the notches are the same, the change in the injection quantity is smaller. Therefore, in this case also, fine adjustment of the injection quantity is realized.

Furthermore, if the notches are provided in positions such that they do not impede the fluid flow entering the nozzle hole, impeding of the fluid flow and consequent reduction of the energy of the fluid flow are prevented. By this means it is possible to inject atomized fluid through the nozzle hole.

BRIEF DESCRIPTION OF THE DRAWINGS

Additional objects and advantages of the present invention will be appreciated, as well as methods of operation and the function of the related parts from a study of the following detailed description, the appended claims, and the drawings, all of which form a part of this application. In the drawings:

FIG. 13 is a schematic plan view illustrating notching locations for a nozzle hole plate having twelve nozzle holes according to a fourth embodiment of the present invention;

FIG. 14 is a schematic plan view illustrating notching locations for a nozzle hole plate having twelve nozzle holes according to a fifth embodiment of the present invention;

FIG. 15 is a characteristic chart showing relationships between flow rate changing rate and pressure load according to the third through fifth embodiments of the present invention;

DETAILED DESCRIPTION OF PREFERRED EMBODIMENTS

Preferred embodiments of the invention will now be described with reference to the accompanying drawings.
(First Preferred Embodiment)

Figure 2:
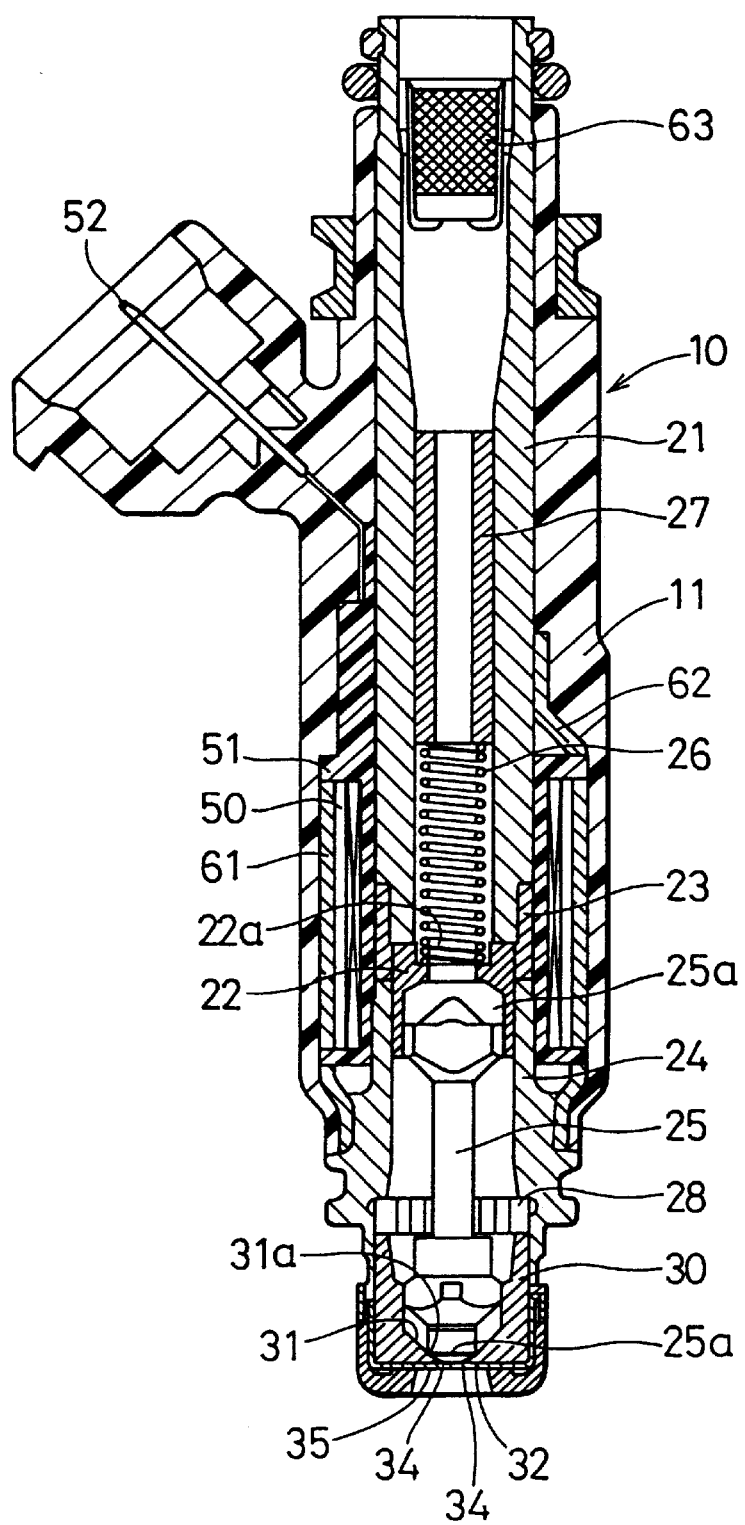
FIG. 2 is a sectional view showing a fuel injection valve in which the nozzle hole plate of the first preferred embodiment is used.

A first preferred embodiment, in which the invention is applied to a fuel injection valve of a fuel supply apparatus of a gasoline engine, is shown in FIG. 2.

As shown in FIG. 2, a fixed core 21 is received inside a resin housing mold 11 of a fuel injection valve 10.

A cylindrical moving core 22, made of a magnetic material, is disposed in a space formed inside a non-magnetic pipe 23 and a magnetic pipe 24. The external diameter of the moving core 22 is set slightly smaller than the internal diameter of the non-magnetic pipe 23, and the moving core 22 is supported slidably in the non-magnetic pipe 23. The moving core 22 faces the fixed core 21 in an axial direction, and is disposed so as to form a predetermined gap between itself and the lower end face of the fixed core 21.

The non-magnetic pipe 23 is fitted around the outside of the lower end of the fixed core 21 and fixed there by laser welding or the like. The magnetic pipe 24, which is made of a magnetic material and formed in the shape of a stepped pipe, is connected to the opposite end of the non-magnetic pipe 23 to the fixed core. This end of the non-magnetic pipe 23 forms a guiding part for guiding the moving core 22.

A needle valve 25 constituting a valve member has a fuel-injection side, tip end face thereof formed substantially flat and has a joining part 25a formed at its other end. The joining part 25a and the moving core 22 are laser-welded together, whereby the needle valve 25 and the moving core 22 are connected integrally. A double chamfer is provided in the periphery of the joining part 25a as a fuel passage.

One end of a compression coil spring 26 abuts upon a spring seat 22a provided on the moving core 22, and the other end of the compression coil spring 26 abuts upon the bottom of an adjusting pipe 27. The compression coil spring 26 urges the moving core 22 and the needle valve 25 downward in FIG. 2, that is, in the direction in which an abutting part 25b of the needle valve 25 seats upon a valve seat 31a of a valve body 30.

The adjusting pipe 27 is press-fitted inside the fixed core 21. By the position to which the adjusting pipe 27 is press-fitted being adjusted at the time of assembly, the urging force of the compression coil spring 26 can be adjusted.

The valve body 30 is inserted into the magnetic pipe 24 after a spacer 28, and is fixed to the magnetic pipe 24 by laser welding or the like. The thickness of the spacer 28 is adjusted to bring the air gap between the fixed core 21 and the moving core 22 to a predetermined value. The internal diameter of the valve body 30 decreases with progress from the tip of the valve body 30 toward a nozzle hole plate 32 joined to the other end of the valve body 30, and an inner circumferential face 31 thereof is conical and forms a fuel passage constituting a fluid passage. The above-mentioned valve seat 31a, upon which seats the abutting part 25b of the needle valve 25, is formed in the inner circumferential face 31.

Figure 3:
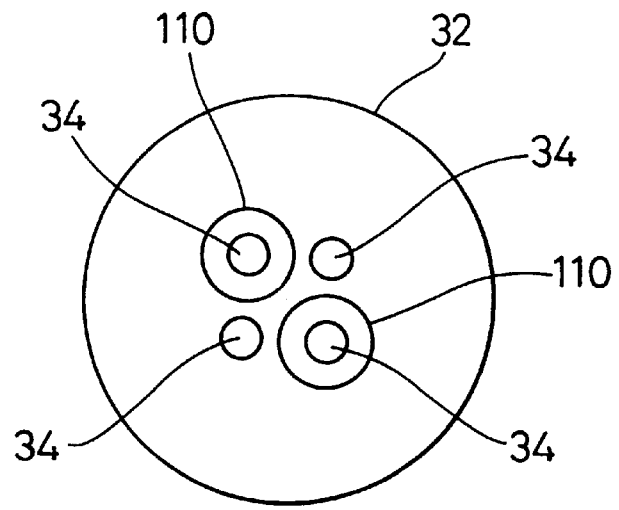
FIG. 3 is a schematic plan view showing nozzle hole openings and dimples in the first preferred embodiment.

The nozzle hole plate 32 is made of stainless steel and formed in the shape of a cup, and is joined to the tip end of the valve body 30 by welding, for example full-circumference welding. The tip end face of the needle valve 25, the inner circumferential face 31 of the valve body 30 and a face of the nozzle hole plate 32 facing the needle valve 25 form a substantially disc-shaped fuel chamber 35. As shown in FIG. 3, four nozzle holes 34 are formed in the nozzle hole plate 32. When the needle valve 25 shown in FIG. 2 unseats from thevalve seat 31a, fuel is injected from the fuel chamber 35 through the nozzle holes 34.

A magnetic coil 50 is wound around a resin spool 51, and the spool 51 is fitted around the fixed core 21, the non-magnetic pipe 23 and the magnetic pipe 24. The above-mentioned housing mold 11 is resin-molded around the magnetic coil 50 and the spool 51, whereby the magnetic coil 50 is enveloped by the housing mold 11. When an electronic control unit (not shown) causes an exciting current to flow from a terminal 52 through a lead wire to the magnetic coil 50, the needle valve 25 and the moving core 22 are attracted against the urging force of the compression coil spring 26 toward the fixed core 21 and the abutting part 25b unseats from the valve seat 31a.

The terminal 52 is embedded in the housing mold 11 and electrically connected to the magnetic coil 50. The terminal 52 is connected to the above-mentioned electronic control unit by a wire harness.

Two metal plates 61 and 62 are members forming a magnetic path through which magnetic flux passes when the magnetic coil 50 is excited, and have an upper end connecting with outside of the fixed core 21 and a lower end connecting with the outside of the magnetic pipe 24. The magnetic coil 50 is protected by these metal plates 61 and 62.

A filter 63 is disposed in the top of the fixed core 21, and removes extraneous matter such as dirt from fuel being delivered from a fuel tank by a fuel pump or the like and flowing into the fuel injection valve 10. Fuel having flowed through the filter 63 into the fixed core 21 passes from the adjusting pipe 27 through the double chamfer formed on the joining part 25a of the needle valve 25 and through a quadruple chamfer formed on a part of the needle valve 25 sliding on the valve body 30 to reach the valve part made up of the abutting part 25b of the needle valve 25 and the valve seat 31a. When the abutting part 25b unseats from the valve seat 31a, fuel flows into the fuel chamber 35 through an opening thus formed between the abutting part 25b and the valve seat 31a.

The operation of this fuel injection valve 10 will now be described.

(1) When the current to the magnetic coil 50 is off, the moving core 22 and the needle valve 25 are urged downward in FIG. 2 by the urging force of the compression coil spring 26, and the abutting part 25b of the needle valve 25 seats upon the valve seat 31a. Consequently, fuel injection through the nozzle holes 34 is cut off.

(2) When the current to the magnetic coil 50 is turned on, because the moving core 22 is attracted to the fixed core 21 against the urging force of the compression coil spring 26, the abutting part 25b of the needle valve 25 unseats from the valve seat 31a. Consequently, fuel flows into the fuel chamber 35 through the opening thus formed between the abutting part 25b and the valve seat 31a.

Fuel flowing into the fuel chamber 35 is guided toward a middle part of the fuel chamber 35 by the inner circumferential face 31, the tip end face of the needle valve 25 and the face of the nozzle hole plate 32 facing the needle valve 25. Flows of fuel heading for this middle part from different directions collide with each other and create a flow heading toward the nozzle holes 34 from the radially inner side, and this fuel flow heading toward the nozzle holes 34 from the inner side collides above the nozzle holes 34 with fuel flows heading toward the nozzle holes 34 from the radially outer side. When fuel flowing into the nozzle holes 34 from all around the nozzle holes 34 substantially uniformly and colliding directly above the nozzle holes 34 like this is injected through the nozzle holes 34, atomization of the fuel spray is promoted.

A process for manufacturing the nozzle hole plate 32 will now be described.

Figure 1A:
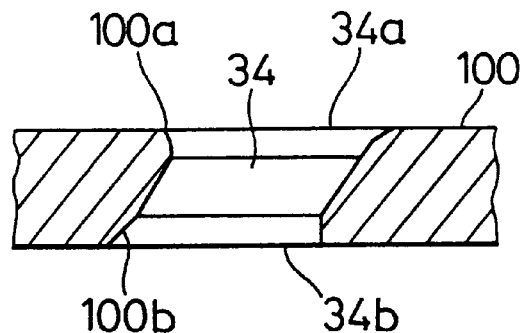
FIG. 1A is a schematic sectional view showing a nozzle hole formed in a base material of a nozzle hole plate according to a first preferred embodiment of the present invention.

(1) As shown in FIG. 1A, the nozzle holes 34 are formed in a thin-plate base material 100 at a predetermined angle of inclination by press-working (press-machining) with a punch (not shown). When a nozzle hole 34 is formed by press-working, a bluntness (shear drop) 100a is formed at the corner of the base material 100 at the fluid entrance 34a of the nozzle hole 34, and a break face 100b is formed at the corner of the base material 100 at the fluid exit 34b.

When a bluntness 100a is not formed at the corner of the fluid entrance 34a, the fuel flow along the fuel upstream side face of the nozzle hole plate 32 must change direction sharply as it enters the nozzle hole 34. As a result of this, because the fuel flow is momentarily constricted at the fluid entrance 34a of the nozzle hole 34, the amount of fuel flowing through the nozzle hole 34 decreases. When on the other hand, a shear drop 100a is formed at the corner of the fluid entrance 34a the constricting effect is reduced, and the larger the shear drop the greater the amount of fuel flow.

Even if the tip of the punch wears/deteriorates with time or the mechanical characteristics of the base material varies, if the same diameter of punch is used, there is little variation in the diameter of the nozzle hole 34. However, variations in the amount of bluntness formed at the corner of the base material 100 around the fluid entrance 34a and the size of the broken-out sectional surface formed at the corner of the base material 100 around the fluid exit 34b does increase.

(2) The quantity of fuel injected through the nozzle holes 34 formed in the base material 100 is measured for each nozzle hole plate, and the difference between this and a target value is obtained. Then, on the basis of the measured values, in the next step (3), the nozzle hole plates are worked with different conditions for each nozzle hole plate.

When as in the first preferred embodiment the nozzle holes 34 are formed by press-working, if the dispersion in the fuel injection quantity is small within the range of a number of consecutive workings, the nozzle hole plates of this number of workings may be taken as a group and worked by group under the same conditions in the next step on the basis of the injection quantity of a sampled nozzle hole plate.

Or, the injection quantity of each nozzle hole plate may be measured and the nozzle hole plates then grouped within small ranges of dispersion and worked under the same conditions by group in the next step.

Figure 1B:
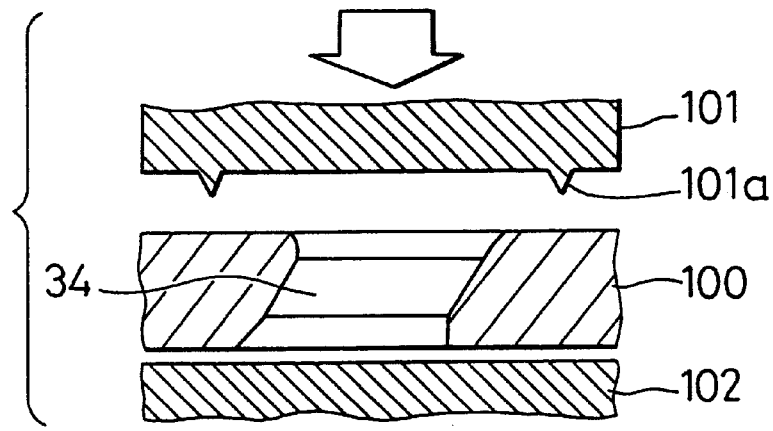
FIG. 1B is a schematic sectional view illustrating a notching of the base material according to the first preferred embodiment of the present invention.
Figure 1C:
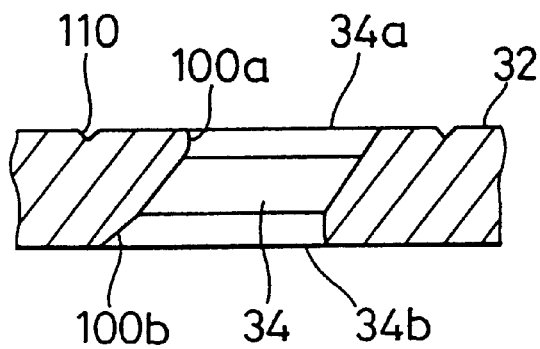
FIG. 1C is a schematic sectional view showing the nozzle hole plate after the notching according to the first preferred embodiment of the present invention.

(3) As shown in FIG. 1B, the base material 100 with the nozzle holes 34 formed therein is placed on a bearing plate 102 and the base material 100 around the fluid entrance of each nozzle hole 34 is notched by press-working using a punch 101 having an annular projection 101a. The base material 100 around the fluid entrance 34a of the nozzle hole 34 is notched (dimpled) as shown in FIG. 1C to form an annular groove 110 shown in FIG. 3, whereby a nozzle hole plate 32 is obtained. In the first preferred embodiment, as shown in FIG. 3, an annular groove 110 is formed in the base material 100 around the fluid entrance 34a of each of two of the four nozzle holes 34.

When the annular groove 110 is formed in the base material 100 around a fluid entrance 34a, the material of the base material 100 is pushed toward the fluid entrance 34a, and the bluntness 100a decreases. As a result, the quantity of fuel injected through the nozzle hole plate 32 decreases.

When the dimple of the annular groove 110 is made larger, because the diameter of the fluid entrance 34a becomes smaller than the fluid path diameter of the nozzle hole 34, the fuel injection quantity decreases further.

Methods for adjusting the injection quantity obtained when this nozzle hole plate is used in a fuel injection valve will now be described. According to a first adjusting method, first, a master injection valve, whose target injection quantity has been measured after assembly thereto of a nozzle hole plate, is prepared.

A nozzle hole plate on which forming holes, deburring and cleaning have been carried out is then assembled to this master injection valve, and the injection quantity of the injection valve is measured. The nozzle hole plate is then removed from the master injection valve and, on the basis of the difference between the measured value just obtained and the target injection quantity, a notching shape, a notching load (pressure load) and a notching position are determined and notching of the nozzle hole plate is carried out so that this difference approaches zero. The nozzle hole plate thus completed is then assembled to a fuel injection valve manufactured in a separate process to produce a finished product.

According to another adjusting method, again, a master injection valve, whose target injection quantity has been measured after assembly thereto of a nozzle hole plate, is prepared. A nozzle hole plate on which forming holes, deburring, cleaning and predetermined notching have been carried out is then assembled to this master injection valve, and the injection quantity of the injection valve is measured. The nozzle hole plate is then removed from the master injection valve and, on the basis of the difference between the measured value just obtained and the target injection quantity, a notching shape, a notching load and a notching position are determined and notching of the nozzle hole plate is carried out again so that this difference approaches zero. The nozzle hole plate thus completed is assembled to a fuel injection valve manufactured in a separate process to produce a finished product.

According to the first preferred embodiment, the annular groove 110 is formed in the base material 100 around the fluid entrance 34a of each of two of the four nozzle holes 34, and thereby only the injection quantities of the two nozzle holes 34 around which the annular grooves 110 are formed are reduced.

Therefore, in adjusting the injection quantity of the nozzle hole plate 32, compared to a case wherein an annular groove 110 is formed in the base material 100 around the fluid entrance 34a of every one of the four nozzle holes 34, if the shape of the dimples (notches) are the same, the amount of reduction in the injection quantity of the nozzle hole plate 32 is smaller. Thus, fine adjustment of the injection quantity becomes possible. When a large amount of adjustment to the injection quantity is necessary, an annular groove 110 may be formed in the base material 100 around the fluid entrance 34a of every one of the four nozzle holes 34.

(Second Preferred Embodiment)

Figure 4:
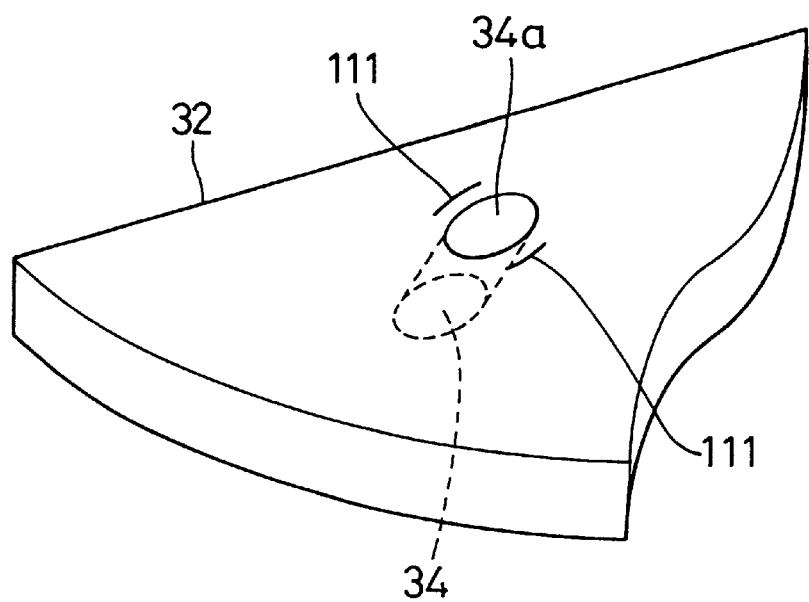
FIG. 4 is a schematic perspective view showing a nozzle hole and dimples according to a second preferred embodiment of the present invention.

Whereas in the first preferred embodiment an annular groove 110 was formed as an dimple in the base material 100 around the fluid entrances 34a of the nozzle holes 34, alternatively, as in a second preferred embodiment illustrated in FIG. 4, a pair of arc-shaped grooves 111 may be formed along the radial direction of the nozzle hole plate 32. Indeed, any shape of notch (dimple) around the fluid entrance of the nozzle hole 34 which deforms the nozzle hole, such as a straight line groove 113 or point dimples 115, 117 shown in FIGS. 5A, 5B and 5C as modified versions of the second preferred embodiment, may be used. Otherwise the second preferred embodiment is the same as the first preferred embodiment.

By providing dimple (notch) only in isolated parts of the base material 100 around the fluid entrance of the nozzle hole 34, it is possible to diminish a phenomenon of fuel flows entering the nozzle hole 34 from the radially outer side and the radially inner side of the nozzle hole plate 32 being hindered by the annular groove 110 and thereby prevent the energy of the fuel flows from falling. Thus it is possible to maintain the degree of atomization of the fuel injected through the nozzle hole 34.

When as in the second preferred embodiment dimples or notches are formed in specified locations around the fluid entrance 34a of the nozzle hole 34 using a punch, if a pilot hole when the nozzle hole 34 was formed with a punch in the previous step is utilized, it is possible to obtain the positions for forming the dimples or notches easily and precisely.

Figures 5A, 5B, 5C:
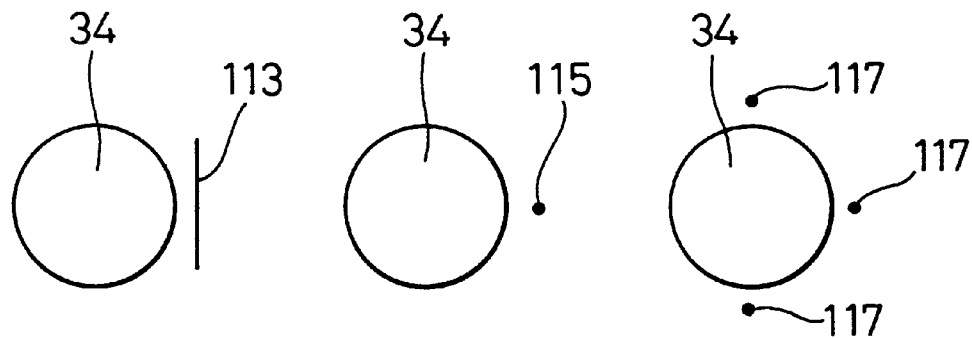
FIGS. 5A, 5B and 5C are schematic plan views illustrating nozzle holes and dimples of modified versions of the second preferred embodiment of the present invention.
Figure 6:
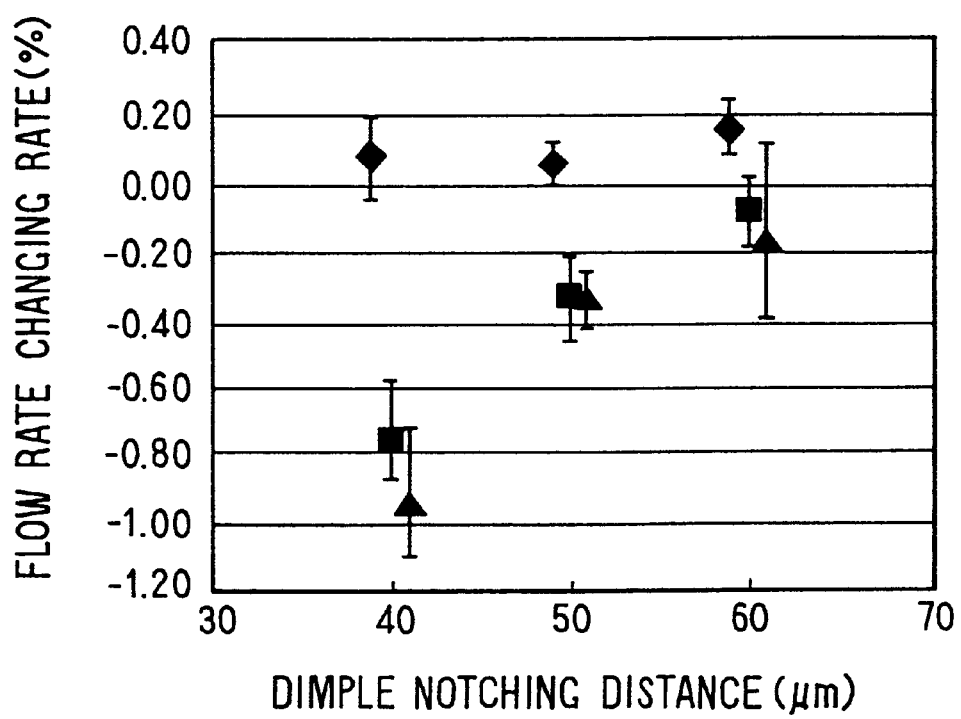
FIG. 6 is a characteristic chart showing relationships between dimple notching distance and flow rate changing rate in a modified version of the second preferred embodiment in which point dimples are formed.
Figure 9:
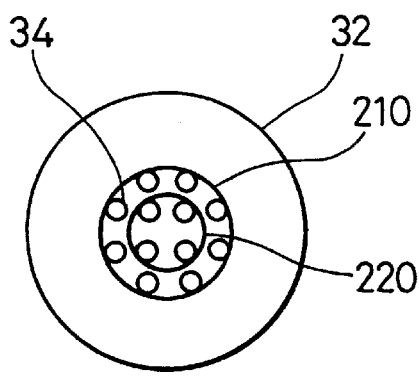
FIG. 9 is a schematic plan view illustrating notching locations for a nozzle hole plate having twelve nozzle holes according to a third embodiment of the present invention.
Figure 10:
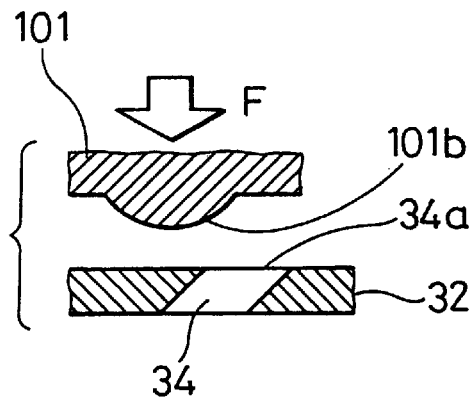
FIG. 10 is a schematic illustration showing a punch shape of a ring-shaped notch and a location of the ring-shaped notch according to the third embodiment of the present invention.
Figure 11:
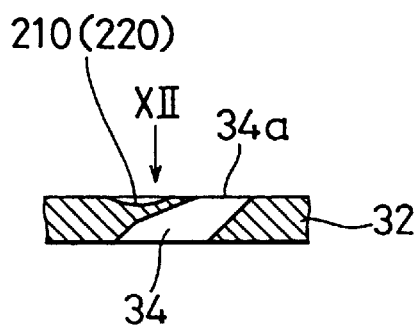
FIG. 11 is a schematic sectional view showing a change of a nozzle hole shape after notching according to the third embodiment of the present invention.
Figure 12:
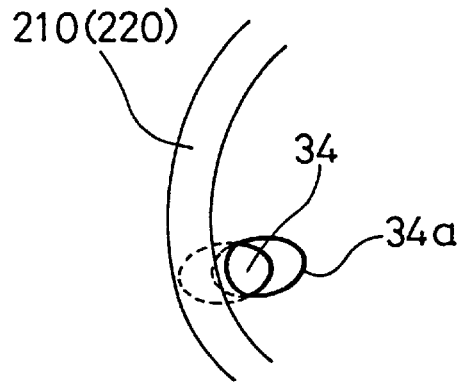
FIG. 12 is a schematic plan view in the direction XII of FIG. 11 to show the change of the nozzle hole shape after notching according to the third embodiment of the present invention.
Figure 7:
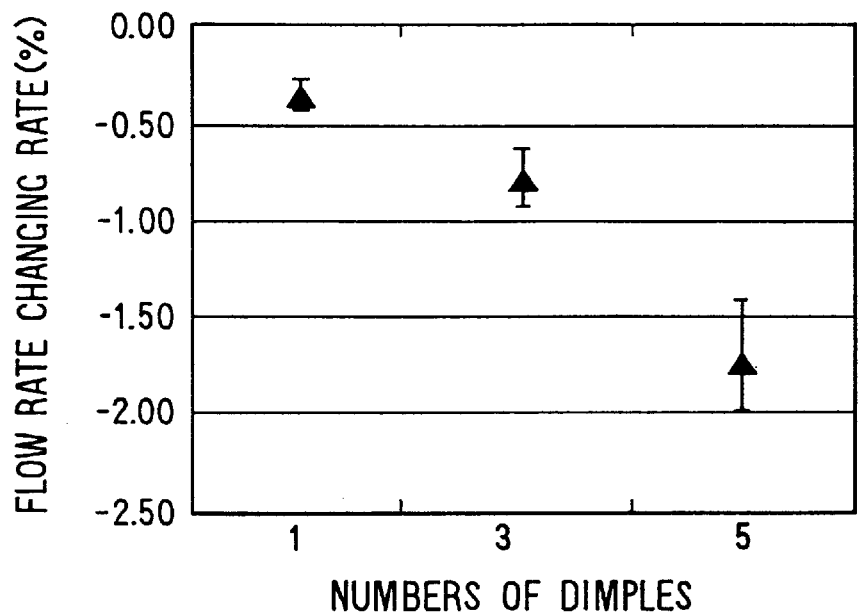
FIG. 7 is a characteristic chart showing relationships between numbers of dimples and flow rate changing rate in the modified version of the second preferred embodiment in which point dimples are formed.

FIGS. 6 and 7 show results of experiments carried out to investigate the relationship between notching distance and flow rate changing ratio, and the relationship between number of dimples (notches) and flow rate changing ratio, for the case of the modified version of the second preferred embodiment wherein the point dimple or dimples are notched around the fluid entrance of a nozzle hole 34 as shown in FIGS. 5B and 5C.

In FIG. 6 and FIG. 7, the notching distance is the distance from the edge of the nozzle hole 34 to the dimple, and the flow rate changing rate is the percentage change (increase or decrease) in flow measured after the notching of the dimples with respect to the flow before the notching of the dimples.

Figure 8A:
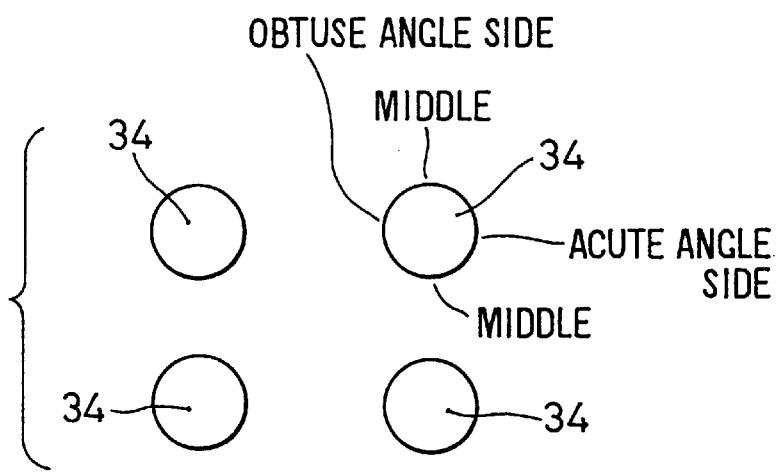
FIG. 8A is a view in the direction VIIIA of FIG. 8B according to the modified version of the second preferred embodiment in which point dimples are formed.
Figure 8B:
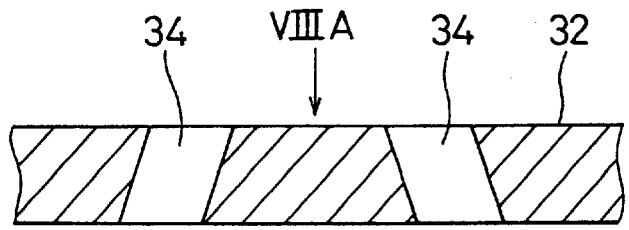
FIG. 8B is a schematic sectional view showing a nozzle hole plate of the modified version of the second preferred embodiment in which point dimples are formed.
Figure 16:
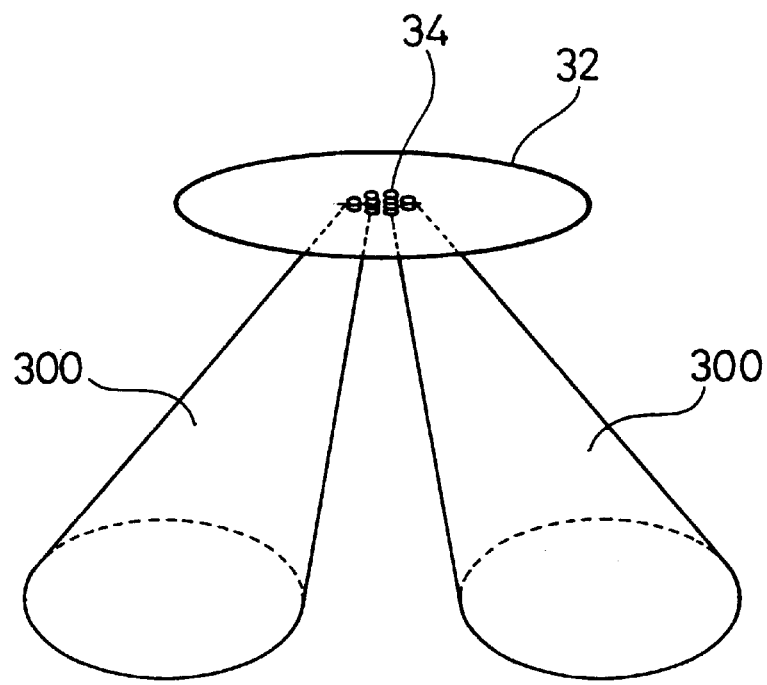
FIG. 16 is a schematic illustration showing a shape of an atomized fuel spray according to the third through fifth embodiments of the present invention.
Figure 17:
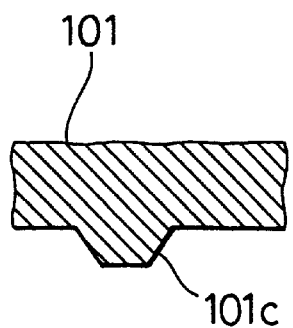
FIG. 17 is a schematic illustration showing a modified punch shape of a ring-shaped notch according to a modification of the third through fifth embodiments of the present invention.
Figure 18:
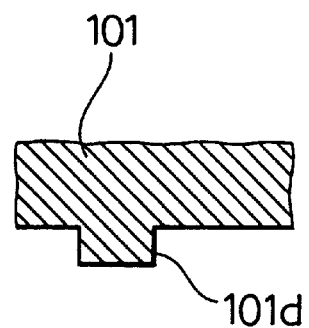
FIG. 18 is a schematic illustration showing a modified punch shape of a ring-shaped notch according to a modification of the third through fifth embodiments of the present invention.

Also in FIG. 6 and FIG. 7, the symbols ♦, ▲ and ■ show positions around the fluid entrance of the nozzle hole 34 in which respective dimples are formed. The symbol ♦ represents the obtuse angle side, ▲ represents the acute angle side and ■ represents the middle. That is, as shown in FIGS. 8A and 8B, the obtuse angle side ♦ is the part of the nozzle hole periphery where the angle formed by the nozzle hole 34 and the nozzle hole plate 32 is an obtuse angle; the acute angle side ▲ is the part where the angle formed by the nozzle hole 34 and the nozzle hole plate 32 is an acute angle; and the middle ■ is an intermediate position between the obtuse angle side ♦ and the acute angle side ▲ where the angle formed by the nozzle hole 34 and the nozzle hole plate 32 is approximately a right angle.

The specifications of the nozzle hole plate 32 used in the experiments are as follows: the material was SUS304-1/2H; the hardness 270 Hv; the plate thickness 0.25 mm; the nozzle hole diameter 0.28 mm; the nozzle hole angle 22°; and the number of nozzle holes 4.

The conditions for forming the dimples are as follows. The notching of the dimples around the fluid entrance of the nozzle hole 34 was carried out using a Micro-Vickers hardness gauge. The notching of the dimples were in the same shape (square pyramid having facing side angle 136°) and were carried out with the same pressure load (1.0 Kgf) at all four nozzle holes. In the plane dimensions of the dimples, the length of one side of the base of the square pyramid was approximately 75 μm (measured). At pressure loads below 0.5 Kgf no change in flow rate was observed.

The flow rate changing rate after notching of dimples with the specifications and conditions above was measured. The relationship between notching distance and flow rate changing rate is shown in FIG. 6. In FIG. 6, the straight lines passing through the notching symbols vertically show measurement widths of the flow rate changing rates. The aim is to reduce the flow by notching.

From FIG. 6 it can be understood that the nearer the notching position (the position of the center of the dimple) is to the nozzle hole edge, the greater the flow rate changing rate (reduction in flow) is. It was also found that, under the conditions of this experiment, when an dimple was formed on the obtuse angle side ♦, no change was observed in the nozzle hole shape and there was hardly any flow change with notching distance. When notching was carried out on the acute angle side ▲ or in the middle ■, on the other hand, a flow reduction of up to 1.2% was obtained.

The relationship between the number of dimples and the flow rate changing rate when the notching distance was made 50 μm is shown in FIG. 7. One, three or five point dimples were formed around the semi-circumference of the acute angle side ▲, where the flow change is great, and the resulting flow rate changing rates were measured. As shown in FIG. 7, under the conditions of this experiment, as the number of dimples is increased a larger flow change is obtained, and a maximum flow reduction of 1.8% was obtained.

According to the preferred embodiments of the invention described above, by dimples being provided in the base material 100 around the fluid entrance 34a of a nozzle hole 34, the bluntness of a shear drop formed at the fluid entrance corner is thereby reduced and the injection quantity is thereby lowered. By this means it is possible to suppress dispersion in injection quantity among nozzle hole plates and adjust the injection quantity of each nozzle hole plate to a required value. Also, because the dimples are formed by press-working, the working can be carried out in a short time.

And even if the punch forming the nozzle holes 34 wears with time and the injection quantity consequently varies, because the injection quantity can be adjusted by dimples or notches being formed in the base material 100 around the fluid entrances 34a, the punch can be used for a longer period. Thus the time between punch replacements is extended and manufacturing cost is reduced.

In the preferred embodiments described above, the nozzle holes 34 are formed by press-working using a punch; however, the nozzle holes may alternatively be formed by electric discharge machining. When the nozzle holes are formed by electric discharge machining, although the corners of the nozzle hole openings are hardly blunted, there tends to be dispersion in the hole diameters. In this case also, because the hole diameters can be reduced by notching (dimpling) the base material around the nozzle hole openings, it is possible to adjust the injection quantity easily in a short time.

Although in the preferred embodiments described above dimples (notches) are formed only in the base material 100 around the fluid entrances 34a of the nozzle holes 34, alternatively dimples (notches) may also be formed in the base material 100 around the fluid exits 34b or in the base material 100 around both the entrances and the exits.

And although the notches in the base material around the openings of the nozzle holes are formed by notching, notches may alternatively be formed by coining.

And although in the preferred embodiments described above a nozzle hole plate manufactured according to the present invention is applied to a fuel injection valve, it may also be applied to a nozzle hole plate for another kind of fluid injection valve.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A method for manufacturing a plate having a nozzle hole for injection of fluid therethrough, the method comprising the steps of:

forming a nozzle hole through a plate;

measuring a quantity of fluid injected through the nozzle hole; and notching the plate around the nozzle hole according to the quantity of fluid measured in the measuring step.

2. A method for manufacturing a plate according to claim 1, wherein said step of notching includes compensating for nozzle hole shear resulting from said step of forming the nozzle hole in the plate.

3. A method for manufacturing a plate according to claim 1, wherein said step of notching includes notching the plate around a fluid entrance opening of the nozzle hole.

4. A method for manufacturing a plate according to claim 3, wherein said step of forming the nozzle hole includes forming a plurality of nozzle holes having respective fluid entrance openings; and said step of notching includes notching the plate around a predetermined number of said fluid entrance openings.

5. A method for manufacturing a plate according to claim 4, wherein said predetermined number is less than said plurality.

6. A method for manufacturing a plate according to claim 3, wherein said step of notching includes notching the plate such that a circle-shaped notch is formed around said fluid entrance opening.

7. A method for manufacturing a plate according to claim 3, wherein said step of notching includes notching the plate such that an arc-shaped notch is formed around said fluid entrance opening.

8. A method for manufacturing a plate according to claim 3, wherein said step of notching includes notching the plate to form a substantially linear notch around said fluid entrance opening.

9. A method for manufacturing a plate according to claim 3, wherein said step of notching includes notching the plate to form a dimple around said fluid entrance opening.

10. A nozzle hole plate manufactured by said method for manufacturing the plate according to claim 1.

11. A nozzle hole plate manufactured by said method for manufacturing the plate according to claim 4.

12. A fuel injecting apparatus comprising:
a nozzle plate installed in the fuel injection apparatus;
a first nozzle hole defined in said plate for injecting fuel therethrough; and
a first nozzle hole deformation notch formed around said first nozzle hole for compensating for a shear created at said first nozzle hole during formation thereof, said first nozzle hole deformation notch having a particular shape which is determined according to a quantity of fuel injected through the first nozzle hole before formation of said first nozzle hole deformation notch.

13. A fuel injection apparatus according to claim 12, wherein said first nozzle hole deformation notch is a circle-shaped notch formed around said first nozzle hole.

14. A fuel injection apparatus according to claim 12, wherein said first nozzle hole deformation notch is an arc-shaped notch formed around said first nozzle hole.

15. A fuel injection apparatus according to claim 12, wherein said first nozzle hole deformation notch is a substantially linear notch formed around said first nozzle hole.

16. A fuel injection apparatus according to claim 12, wherein said first nozzle hole deformation notch is a dimple formed around said first nozzle hole.

17. A method for manufacturing a plate according to claim 1, wherein said step of notching includes deforming the first nozzle hole such that size of the first nozzle hole is reduced.

18. A method for manufacturing a plate according to claim 1, further comprising forming a second nozzle hole, measuring a quantity of fluid injected through the second nozzle hole, and notching the plate around the second nozzle hole according to the quantity of fluid measured during said step of measuring a quantity of fluid injected through the second nozzle hole.

19. A fuel injection apparatus according to claim 12, further comprising a second nozzle hole; and a second nozzle hole deformation notch formed around said second nozzle hole, said second nozzle hole deformation notch being different from said first nozzle hole deformation notch.

20. A method for manufacturing a nozzle hole plate for fluid injection, the method comprising the steps of:
providing a plate;
forming a nozzle hole through said plate;
measuring a quantity of fluid injected through said nozzle hole; and
deforming said plate adjacent an opening of said nozzle hole according to the quantity of fluid measured during said measuring step, thereby to change a quantity of fluid that can be injected through the nozzle hole.

21. A method as in claim 20, further comprising, after said measuring step, determining at least one of a shape of said deformation and a location of said deformation on a basis of a difference between the measured quantity of injected fluid and a target quantity of injected fluid, so as to reduce said difference.

22. A method as in claim 20, wherein said step of deforming comprises notching the plate around at least a part circumference of the nozzle hole.

23. A method as in claim 22, wherein said notch is an arc shaped notch.

24. A method as in claim 20, wherein said step of deforming includes deforming the plate around a fluid entrance opening of the nozzle hole.

* * * * *